US007860060B2

(12) United States Patent
Promenzio et al.

(10) Patent No.: US 7,860,060 B2
(45) Date of Patent: *Dec. 28, 2010

(54) METHOD AND APPARATUS TO FACILITATE PERSISTENCE OF A HANDED-OFF COMMUNICATION SYSTEM

(75) Inventors: Edgardo L. Promenzio, Round Lake, IL (US); Ajaykumar R. Idnani, Hoffman Estates, IL (US); Yi-Cheng Liu, Barrington, IL (US); Rajendra A. Panchal, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 272 days.

This patent is subject to a terminal disclaimer.

(21) Appl. No.: 11/299,430

(22) Filed: Dec. 12, 2005

(65) Prior Publication Data
US 2007/0133466 A1 Jun. 14, 2007

(51) Int. Cl.
*H04W 4/00* (2009.01)
(52) U.S. Cl. ............... 370/331; 455/436; 455/437; 455/438; 455/444; 370/328; 370/329; 370/330
(58) Field of Classification Search ............. 455/403, 455/422.1, 436–445; 370/328–331
See application file for complete search history.

(56) References Cited

U.S. PATENT DOCUMENTS

| 6,167,432 | A | 12/2000 | Jiang |
| 7,379,968 | B2 | 5/2008 | Schuh |
| 7,409,218 | B2 | 8/2008 | Bonta |
| 7,460,508 | B2 | 12/2008 | Dssouli et al. |
| 2003/0145054 | A1 | 7/2003 | Dyke |
| 2004/0175830 | A1 | 9/2004 | Bowdish et al. |
| 2004/0221037 | A1 | 11/2004 | Costa-Requena et al. |
| 2004/0249951 | A1* | 12/2004 | Grabelsky et al. ........... 709/227 |
| 2004/0264410 | A1* | 12/2004 | Sagi et al. ................... 370/331 |
| 2004/0266426 | A1* | 12/2004 | Marsh et al. ............. 455/426.2 |
| 2005/0036509 | A1 | 2/2005 | Acharya et al. |
| 2005/0047582 | A1 | 3/2005 | Shaffer et al. |
| 2005/0074111 | A1 | 4/2005 | Hanson et al. |
| 2005/0119005 | A1* | 6/2005 | Segal et al. ................. 455/445 |
| 2005/0124326 | A1 | 6/2005 | Belkin et al. |

(Continued)

FOREIGN PATENT DOCUMENTS

WO   WO 2005/064883 A1   7/2005

OTHER PUBLICATIONS

Koskelainen, P. et al.: "Requirements for Floor Control", draft-koskelainen-mmusic-floor-req-01.txt, Internet Engineering Task Force, Internet Draft, Oct. 31, 2002, Expires May 2003, pp. 1-9.

(Continued)

*Primary Examiner*—Lester Kincaid
*Assistant Examiner*—Mehmood B Khan (57) ABSTRACT

During a communication session (101) for a multi-network user platform (which communication session is presently occurring in a first network and is terminable by a Session Initiation Protocol server as comprises a part of that first network), one establishes (102) in the first network a Session Initiation Protocol instance as corresponds to the communication session. Thereafter, and particularly following a hand-off of the communication session from the first network to a second network, one uses (104) the Session Initiation Protocol instance to maintain communications with the Session Initiation Protocol server such that the Session Initiation Protocol server does not terminate the communication session.

17 Claims, 4 Drawing Sheets

U.S. PATENT DOCUMENTS

| | | |
|---|---|---|
| 2005/0237978 A1* | 10/2005 | Segal ..................... 370/331 |
| 2005/0260976 A1 | 11/2005 | Khartabil et al. |
| 2005/0262249 A1 | 11/2005 | Koskelainen |
| 2005/0273510 A1 | 12/2005 | Schuh |
| 2006/0031290 A1 | 2/2006 | Mannaru et al. |
| 2006/0121891 A1* | 6/2006 | Jagadeesan et al. ......... 455/417 |
| 2006/0270447 A1* | 11/2006 | Everson et al. ........... 455/552.1 |

OTHER PUBLICATIONS

Khartabil, H. et al.: "The Conference Policy Control Protocol (CPCP)", draft-ietf-xcon-cpcp-01.txt, XCON, Internet-Draft, Expires Apr. 12, 2005, pp. 1-38.

A. Johnston and O. Levin: "Session Initiation Protocol Call Control—Conferendng for user Agents", Draft-ietf-sipping-cc-conferencing-06.txt, SIPPING Working Group, Internet-Draft, Expires May 30, 2005, pp. 1-35.

* cited by examiner

METHOD AND APPARATUS TO FACILITATE PERSISTENCE OF A HANDED-OFF COMMUNICATION SYSTEM

RELATED APPLICATIONS

Two co-pending applications as were filed on even date herewith contain related subject matter (the full contents of which are incorporated herein by this reference). These two co-pending applications are:

U.S. patent application Ser. No. 11/299,429 entitled METHOD AND APPARATUS TO FACILITATE USE OF A SESSION INITIATION PROTOCOL INSTANCE TO SUPPORT ON-HOLD SESSION STATUS;

U.S. patent application Ser. No. 11/301,143 entitled METHOD AND APPARATUS TO FACILITATE TRANSFERRING CHAIRMANSHIP OF AN AD-HOCCONFERENCE CALL.

TECHNICAL FIELD

This invention relates generally to communication networks and more particularly to handoff functionality.

BACKGROUND

Communication networks of various kinds are known. A communication session typically comprises the facilitation of communications between two or more user platforms. In more recent times increased interest exists with respect to using Session Initiation Protocol (SIP)-based platforms to support and facilitate one or more aspects of such communication sessions. Using such an approach a Session Initiation Protocol server can be employed to support various communication session activities. For example, on-hold status for one or more user platforms can be supported in this manner.

Mobile user platforms are also known in the art. Such user platforms may comprise, for example, a personal device that a given user carries on their person. Such mobile user platforms may exhibit mobility before, during, and/or after a given communication session. An increasing number of such mobile platforms comprise multi-network user platforms and are capable of compatible operation on more than one type of communication network. Mobility in the case of a multi-network user platform, of course, can lead to a need to hand off a given user platform from one network to another in order to ensure the provision of adequate communication connectivity.

At present, when a first communication network hands off a given user platform to a second communication network during the course of a communication session where that communication session is serviced by (and terminable by) a Session Initiation Protocol server as comprises a part of that first communication network, the Session Initiation Protocol server will terminate the communication session.

This occurs at least in part because all Session Initiation Protocol dialogs typically terminate when a corresponding active user platform leaves the network as occurs during such a hand off. This means, in part, that the Session Initiation Protocol server no longer receives status and/or control messages and/or responses (such as, for example, caller identification information, Session Initiation Protocol INVITE messages, and so forth) that it expects to receive from the handed-off user platform. At some point the Session Initiation Protocol server simply concludes that the corresponding mobile station has been lost and accordingly terminates the session.

This, of course, can present problems. Most end users will object to having their ongoing communications abruptly interrupted in this manner. Furthermore, in many or most cases, the user receives no specific indication that a hand off has occurred. The user is therefore not only frustrated with respect to their intentions but have no information by which to ascertain the nature or cause of the failure. It would be possible, of course, to reprogram (or replace) Session Initiation Protocol servers to behave differently than has been described above. Existing legacy Session Initiation Protocol server installations, however, are numerous, represent a significant investment, and are not under common administrative control. All of these factors make such a solution paradigm undesirable and unlikely to be implemented in the near future.

BRIEF DESCRIPTION OF THE DRAWINGS

The above needs are at least partially met through provision of the method and apparatus to facilitate persistence of a handed-off communication session described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments and during a communication session for a multi-network user platform (which communication session is presently occurring in a first network and is terminable by a Session Initiation Protocol server as comprises a part of that first network), one establishes in the first network a Session Initiation Protocol instance as corresponds to the communication session. Thereafter, and particularly following a hand-off of the communication session from the first network to a second network, one uses the Session Initiation Protocol instance to maintain communications with the Session Initiation Protocol server such that the Session Initiation Protocol server does not terminate the communication session.

By one approach this Session Initiation Protocol instance can comprise a Session Initiation Protocol user agent instantiation proxy. By one approach this Session Initiation Protocol instance is provisioned with context information as corresponds to the communication session. If desired, such information can further be used to provision a handed-off multi-network user platform when and as the latter returns to the first network. By one approach the Session Initiation Protocol instance can serve to interact with the Session Initiation Protocol server as a proxy or surrogate for the handed-off multi-network user platform. For example, the Session Initiation Protocol instance can automatically respond to some (or all) messages from the Session Initiation Protocol server as are directed to the multi-network user platform.

So configured, these teachings permit network-to-network handoffs without causing a corresponding termination of the communication session by a Session Initiation Protocol server. Those skilled in the art will recognize and appreciate that these teachings are implementable at relatively little cost and without necessarily requiring reprogramming of legacy infrastructure such as the existing Session Initiation Protocol server base. It will further be appreciated that these teachings greatly facilitate the ability of a given end user to move about without introducing corresponding interruptions in service. These teachings in particular aid in providing such an end user with a relatively transparent and seamless service experience notwithstanding their relative movement with respect to a plurality of different communication networks.

Figure 1:
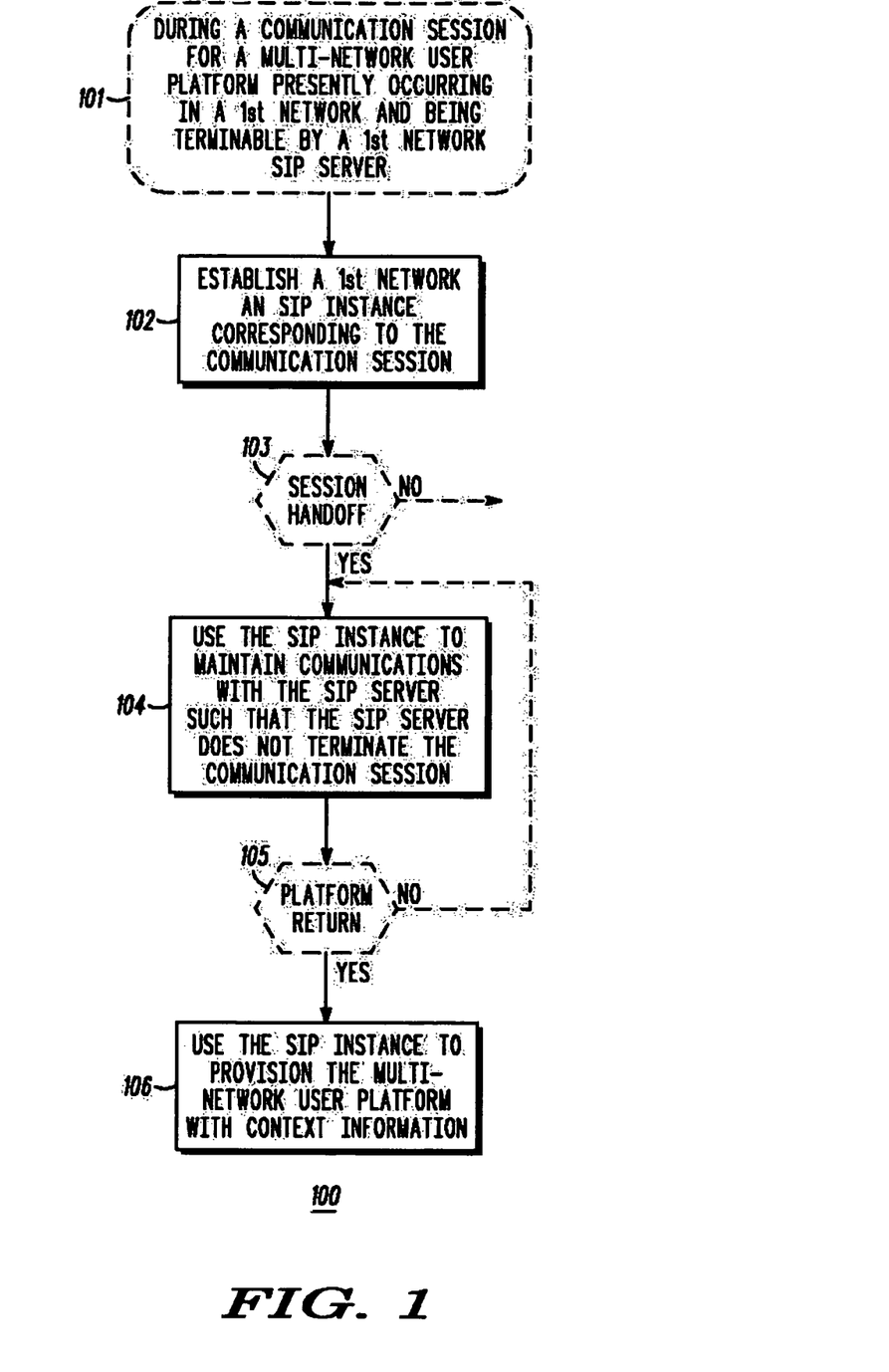
FIG. 1 comprises a flow diagram as configured in accordance with various embodiments of the invention.

These and other benefits may become clearer upon making a thorough review and study of the following detailed description. Referring now to the drawings, and in particular to FIG. 1, a corresponding process 100 may be applied during 101 a communication session for a multi-network user platform, where the communication session is presently occurring in a first network and is terminable by a Session Initiation Protocol server as comprises a part of that first network. This process 100 provides in particular for establishing 102 in the first network a Session Initiation Protocol instance as corresponds to this communication session. By one approach this Session Initiation Protocol instance can comprise, if desired, a Session Initiation Protocol user agent instantiation proxy.

Such establishment can comprise, for example, provisioning the Session Initiation Protocol user agent instantiation proxy with context information as corresponds to the communication session. Such context information can be provided, for example, by transmission from the multi-network user platform itself (either directly to the Session Initiation Protocol user agent instantiation proxy or via one or more intermediary network elements as may best suit the needs and/or requirements of a given application setting).

By one approach, the Session Initiation Protocol instance can be established and/or maintained on a relatively on-going fashion. By another approach the establishment of the Session Initiation Protocol instance is occasioned by a predetermined trigger (or triggers) of choice. For example, by one approach, this process 100 can provide for establishment 102 of a Session Initiation Protocol instance as an automatic response to detecting a handoff opportunity as corresponds to the multi-network user platform with respect to handing off from the first network to the second network.

Figure 2:
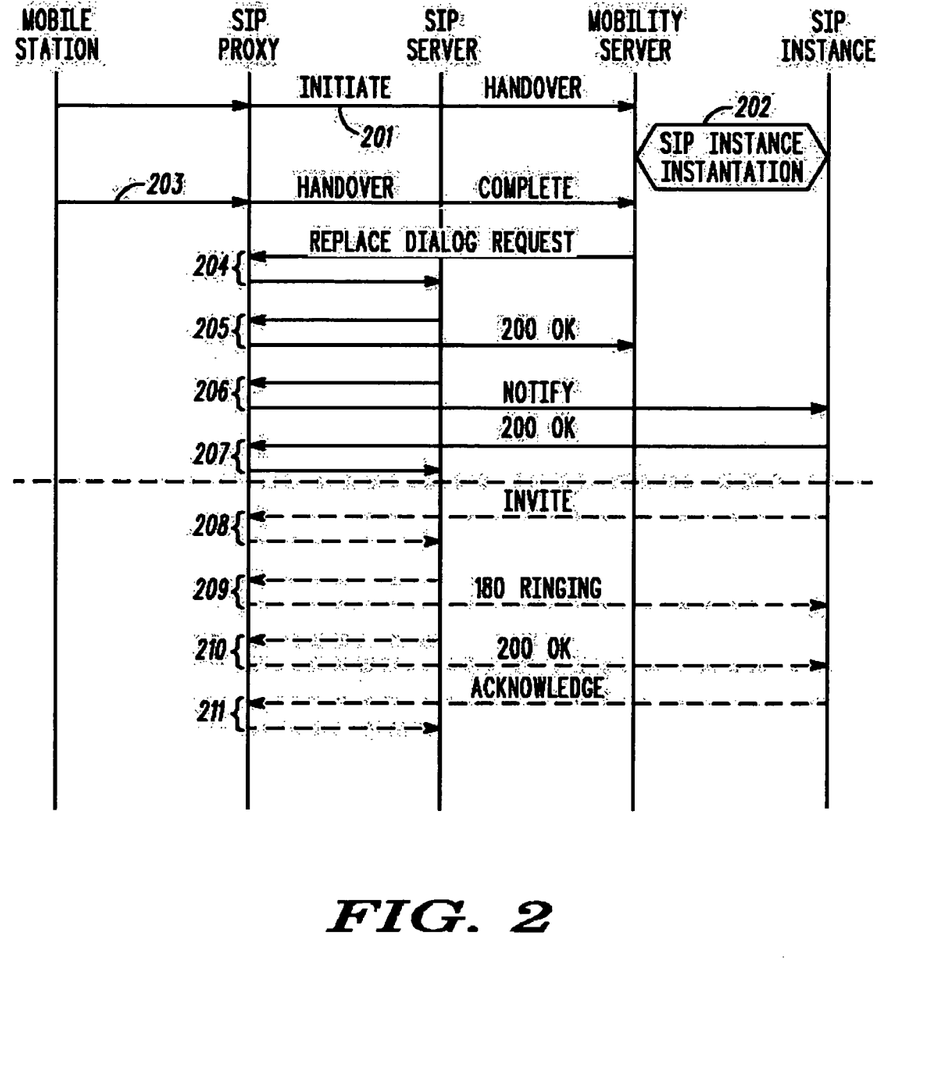
FIG. 2 comprises a call flow diagram as configured in accordance with various embodiments of the invention.

With momentary reference to FIG. 2, an illustrative specific approach to establishing an Session Initiation Protocol instance will be presented (which those skilled in the art will understand to comprise only one of many possible approaches with respect to effecting this step). In this illustrative example, in response to when a mobile station initiates a handover 201 with a mobility server via a corresponding Session Initiation Protocol proxy (in accordance with well-understood prior art practice), the mobile server interacts with a Session Initiation Protocol instance to effect instantiation 202 of a Session Initiation Protocol instance as corresponds to the existing communication session for the mobile station. As noted above this Session Initiation Protocol instance can comprise, by one approach, session context information for the communication session. When the mobile station then indicates completion of the handover 203 to the mobility server, the mobile station can further indicate corresponding dialog content as relates to the Session Initiation Protocol server.

By one approach, the mobility server can then source a request 204 to the Session Initiation Protocol server to replace the existing communication session dialog for a new dialog that establishes a corresponding link with the Session Initiation Protocol instance. (Such a request can comprise, for example, an existing Session Initiation Protocol message as may be incorporated for such service or can comprise a proprietary (or partially proprietary) message as may best suit the needs of a given application setting and as will be understood by those skilled in the art.) The Session Initiation Protocol server, upon receiving and acting upon the request to change the dialog, can respond with a 200 OK message 205 to indicate/acknowledge such actions. The Session Initiation Protocol server can then source a corresponding NOTIFY message 206 for the benefit of the Session Initiation Protocol instance to which the latter can reply with a 200 OK message 207.

Those skilled in the art will understand and appreciate that the above described steps comprise but one illustrative technique that may be employed for these purposes. As another illustrative example, if desired and in lieu of steps 204 through 207, the Session Initiation Protocol instance can transmit an INVITE message 208 to the Session Initiation Protocol server to thereby effect replacement of the original dialog content with information received during the handover process. The Session Initiation Protocol server can respond with a 180 RINGING message 209 and a 200 OK message 210 to which the Session Initiation Protocol instance can respond with an ACK message 211.

Again, those skilled in the art will recognize and appreciate that there are other ways to effect the establishment of a Session Initiation Protocol instance with respect to a given user platform and a given corresponding communication session.

Returning to FIG. 1, thereafter (and optionally, subsequent to detecting 103 the initiation or other indication of an imminent handoff), this process 100 provides for using 104 the Session Initiation Protocol instance to maintain communications with the Session Initiation Protocol server (subsequent to the handoff) such that the Session Initiation Protocol server does not terminate the communication session. The specific actions taken will of course vary with the specific requirements of a given application setting.

By one approach, however, the Session Initiation Protocol instance can, for example, automatically respond to at least some messages from the Session Initiation Protocol server as are directed to the multi-network user platform. Such an automated response may be particularly appropriate for use with respect to Session Initiation Protocol server-initiated messages that are primarily intended to use in confirming the continued presence and activity of the multi-network user platform as a part of the Session Initiation Protocol server's session maintenance protocol.

By another approach, in addition to that presented above or in lieu thereof, the Session Initiation Protocol instance can be configured and arranged to automatically forward at least some messages from the Session Initiation Protocol server as are directed to the multi-network user platform in the second network. This approach may be particularly useful, for example, with respect to handling specific messages (such as, but not limited to, a call state NOTIFICATION message, a final response (such as a 200 OK or an ACK message), and so forth) that may better be handled other than by an automated response. Such messages may be forwarded from the Session Initiation Protocol instance to the handed off multi-network user platform using a bearer channel of choice and/or opportunity.

By yet another approach, and again in combination with either of the above suggested approaches or in lieu thereof, the Session Initiation Protocol instance may be configured and arranged to send at least one command message from the multi-network user platform to the Session Initiation Protocol server. Such a command message may comprise, for example, a response to a forwarded message as has been forwarded by the Session Initiation Protocol instance or may comprise a command message such as an instruction to place, for example, a previously held call into active participation with respect to the communication session.

If desired, the Session Initiation Protocol instance can be programmed and configured to automatically forward only some, and not necessarily all, messages as are received from the Session Initiation Protocol server and/or the multi-network user platform. Such discretion and/or selectivity can be particularly useful when deployed in conjunction with the described ability to source an automated response to the originating element.

Those skilled in the art will also understand and appreciate that the Session Initiation Protocol instance may be provided with a corresponding capability to (itself or via a remote agent) translate messages to be forwarded into an appropriate compatible protocol to ensure compatible reception by the intended forwarding recipient. Protocol-to-protocol translation comprises a well-understood area of endeavor and requires no further elaboration here.

Configuring and programming the Session Initiation Protocol instance to automatically respond to and/or otherwise forward messages to and from the handed-off multi-network user platform as described above can serve a variety of purposes. At a minimum, such activity may serve, wholly or partially, to convince the Session Initiation Protocol server of the multi-network user platform's effective presence such that the Session Initiation Protocol server does not terminate the communication session. Beyond this, such actions can further serve to provide the end user with a relatively transparent, seamless service experience. Such capability will also be understand as facilitating improved or even optimized signaling activity with respect to the system(s) itself.

The teachings set forth above serve to prevent a Session Initiation Protocol server from terminating a communication session following a handoff of a multi-network user platform from a network that includes the Session Initiation Protocol server to another network that does not. This process 100 may optionally further provide for responding to detection 105 of a return of the multi-network user platform to the network that includes the Session Initiation Protocol server by using 106 the Session Initiation Protocol instance to provision the returning multi-network user platform with context information sufficient to permit the latter to resume a direct dialog with the Session Initiation Protocol server. This, in turn, will permit the Session Initiation Protocol instance to withdraw from serving as a user agent instantiation proxy for the multi-network user platform.

Figure 3:
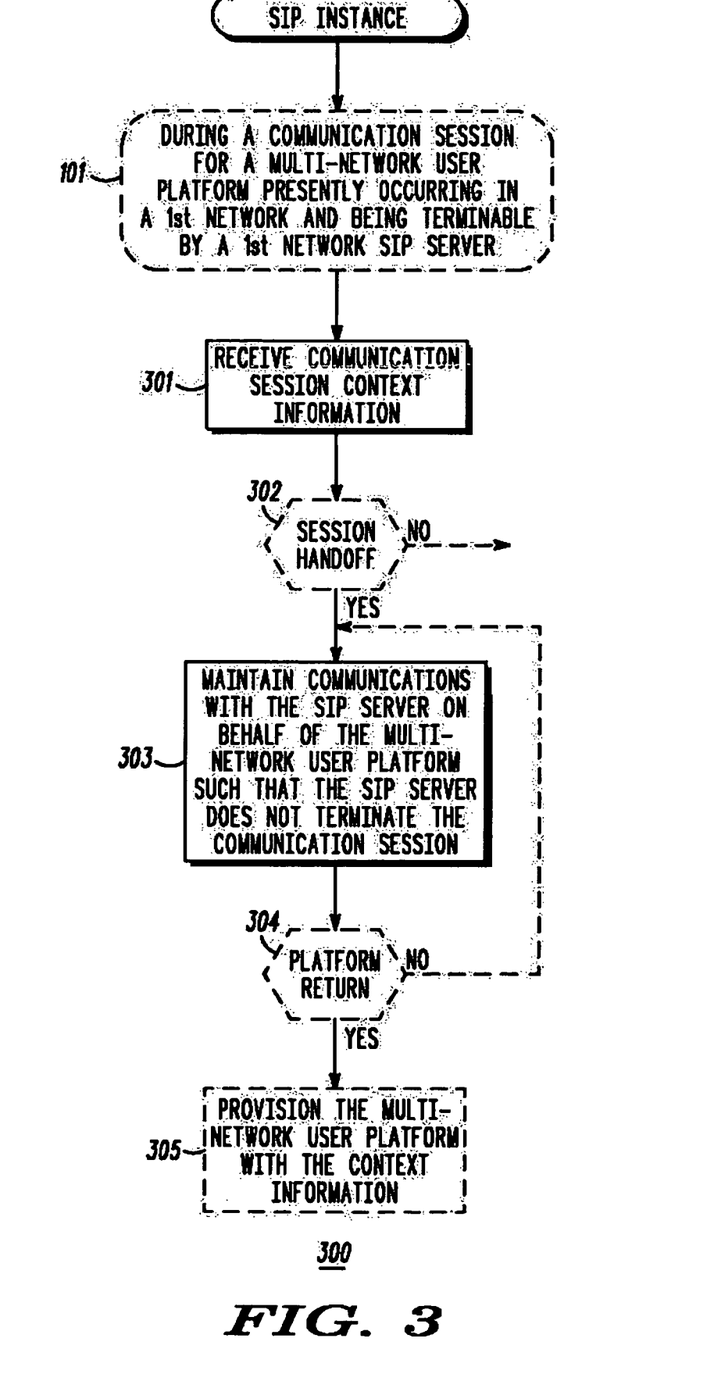
FIG. 3 comprises a flow diagram as configured in accordance with various embodiments of the invention.

Referring now to FIG. 3, a Session Initiation Protocol instance as described above can be configured and arranged to support the described teachings. In particular, such a Session Initiation Protocol instance can be programmed to implement the illustrated process 300. As before, this process 300 is usefully implemented during a communication session for a multi-network user platform which communication session is presently occurring in a first network that includes a Session Initiation Protocol server that has the ability and authority to terminate the communication session.

By this process 300 the Session Initiation Protocol instance can receive 301 context information as corresponds to the communication session (wherein the context information can be received, for example, from the multi-network user platform itself). Following a handoff of the multi-network user platform to another network (where optionally this handoff is detected 302 by the Session Initiation Protocol instance), the Session Initiation Protocol instance then maintains communications with the Session Initiation Protocol server on behalf of the multi-network user platform (using, for example, the previously provided session context information) in order to effectively prevent the Session Initiation Protocol server from terminating the communication session notwithstanding that bearer support for the multi-network user platform has, in fact, been handed off to another network such that the Session Initiation Protocol server would otherwise ordinarily now terminate the communication session.

This can comprise, as noted above, automatically responding to some, all, or specifically less than all messages as may be sourced by the Session Initiation Protocol server, forwarding some or all Session Initiation Protocol server-sourced messages to the multi-network user platform, and/or forwarding to the Session Initiation Protocol server some or all multi-network user platform-sourced messages.

If desired, the Session Initiation Protocol instance can further (and optionally) be programmed to respond to detection 304 of a return of the multi-network user platform to the network that includes the Session Initiation Protocol server by automatically provisioning the returning multi-network user platform with context information as corresponds to the communication session. This, in turn, facilitates permitting the returned multi-network user platform to resume a direct dialog with the Session Initiation Protocol server in a manner that again avoids having the Session Initiation Protocol server terminate the communication session.

Figure 4:
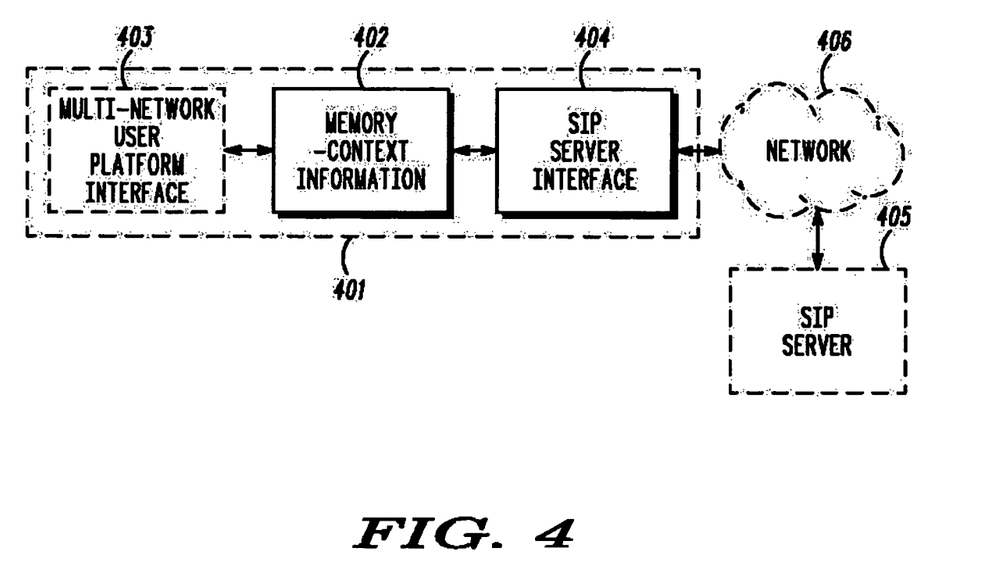
FIG. 4 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 4, an illustrative approach to such a platform will now be provided. In this illustrative embodiment, a Session Initiation Protocol instance 401 comprises a memory 402 having stored therein context information as corresponds to a communication session for a multi-network user platform as described above. Such information can have been originally received, for example, via an optional multi-network user platform interface 403. In such a configuration, if desired, the multi-network user platform interface 403 can further be configured and programmed to detect a return of the multi-network user platform to the first network and to respond thereto by provisioning the multi-network user platform with corresponding context information.

The Session Initiation Protocol instance 401 may also comprise a Session Initiation Protocol server interface 404 that operably couples to the memory 402 and that is configured and arranged to maintain communications with the Session Initiation Protocol server 405 (via, for example, an intervening network 406 of choice or circumstance) as per these teachings to thereby effectively prevent the Session Initiation Protocol server from responding to the handoff event by terminating the communication session.

Those skilled in the art will recognize and understand that other elements and/or functionality may be provided as well if desired. For example, a specific interface to permit compatible communications with a mobility server as described earlier may be useful in some settings. Those skilled in the art will further recognize and understand that a Session Initiation Protocol instance 401 may be comprised of a plurality of physically distinct elements as is suggested by the illustration shown in FIG. 4 but that it is also possible to view this illustration as comprising a logical view, in which case one or more of these elements can be enabled and realized via a shared platform. It will also be understood that such a shared platform may comprise a wholly or at least partially programmable platform as are known in the art.

So configured, a Session Initiation Protocol instance can be established and maintained (using, for example, session context information as may be provided by a handing-off mobile station) to serve, at least in part, as a surrogate of sorts for the handing-off mobile station. This Session Initiation Protocol instance serves, at least in part, to effectively convince the Session Initiation Protocol server of the presence of the multi-network user platform notwithstanding that the latter has, in fact, been handed off to another network that does not include the Session Initiation Protocol server. This, in turn, serves to effectively prevent the Session Initiation Protocol server from terminating the handed off communication session. These teachings are also able, if desired, to facilitate returning direct dialog capability to a returning multi-network user platform.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising, during a communication session for a multi-network user platform, for which communication session is presently occurring in a first network and wherein the communication session can be terminated by a Session Initiation Protocol server as comprises a part of that first network:
    establishing in the first network a Session Initiation Protocol instance for use to maintain the communication session wherein the Session Initiation Protocol instance comprising, at least in part, session context information for the user platform that is on hold and wherein establishing in the first network a Session Initiation Protocol instance comprising establishing a Session Initiation Protocol user agent instantiation proxy, provisioning the Session Initiation Protocol user agent instantiation proxy with context information as corresponds to the communication session and transmitting the context information from the multi-network user platform to the Session Initiation Protocol user agent instantiation proxy;
    following a handoff of the communication session from the first network to a second network, using the Session Initiation Protocol instance to maintain communications with the Session Initiation Protocol server subsequent to the handoff by communicating with the Session Initiation Protocol server such that the Session Initiation Protocol server does not terminate the communication session.

2. The method of claim 1 further comprising:
    detecting a return of the multi-network user platform to the first network and in response thereto using the Session Initiation Protocol user agent instantiation proxy to provision the multi-network user platform with context information.

3. The method of claim 1 wherein establishing in the first network a Session Initiation Protocol instance as corresponds to the communication session further comprises establishing the Session Initiation Protocol instance in response to detecting a handoff opportunity as corresponds to the multi-network user platform from the first network to the second network.

4. The method of claim 1 wherein using the Session Initiation Protocol instance to maintain communications with the Session Initiation Protocol server further comprises using the Session Initiation Protocol instance to automatically respond to at least some messages from the Session Initiation Protocol server as are directed to the multi-network user platform.

5. The method of claim 1 wherein using the Session Initiation Protocol instance to maintain communications with the Session Initiation Protocol server further comprises using the Session Initiation Protocol instance to automatically forward at least some messages from the Session Initiation Protocol server as are directed to the multi-network user platform in the second network.

6. The method of claim 1 wherein using the Session Initiation Protocol instance to maintain communications with the Session Initiation Protocol server further comprises using the Session Initiation Protocol instance to send at least one command message from the multi-network user platform to the Session Initiation Protocol server.

7. A method comprising, during a communication session for a multi-network user platform, for which communication session is presently occurring in a first network and which can be terminated by a Session Initiation Protocol server as comprises a part of that first network:
    at a Session Initiation Protocol instance as comprises a part of the first network and for maintaining the communication session wherein the Session Initiation Protocol instance comprising, at least in part, session context information for the user platform that is on hold:
    receiving context information for the communication session;
    establishing a Session Initiation Protocol user agent instantiation proxy;
    provisioning the Session Initiation Protocol user agent instantiation proxy with context information as corresponds to the communication session;
    transmitting the context information from the multi-network user platform to the Session Initiation Protocol user agent instantiation proxy;
    following a handoff of the communication session from the first network to a second network, maintaining communications with the Session Initiation Protocol server on behalf of the multi-network user platform by the Session Initiation Protocol instance communicating with the Session Initiation Protocol server such that the Session Initiation Protocol server does not terminate the communication session.

8. The method of claim 7 wherein receiving context information for the communication session comprises receiving the context information from the multi-network user platform.

9. The method of claim 7 further comprising:
    detecting a return of the multi-network user platform to the first network and in response thereto provisioning the multi-network user platform with context information as corresponds to the communication session.

10. The method of claim 7 wherein maintaining communications with the Session Initiation Protocol server on behalf of the multi-network user platform further comprises automatically responding to at least some messages from the Session Initiation Protocol server as are directed to the multi-network user platform.

11. The method of claim 7 wherein maintaining communications with the Session Initiation Protocol server on behalf of the multi-network user platform further comprises automatically forwarding to the multi-network user platform at least some messages from the Session Initiation Protocol server as are directed to the multi-network user platform.

12. The method of claim 11 wherein using the Session Initiation Protocol instance to automatically forwarding to the multi-network user platform at least some messages from the Session Initiation Protocol server as are directed to the multi-network user platform further comprises automatically forwarding to the multi-network user platform at least some, but not all, messages from the Session Initiation Protocol server as are directed to the multi-network user platform.

13. A Session Initiation Protocol user agent proxy comprising:
   a memory having stored therein context information as corresponds to a communication session for a multi-network user platform wherein the context information for the multi-network user platform that is on hold, which communication session has been handed off from a first network to a second network and where the communication session is terminable by a Session Initiation Protocol server as comprises a part of the first network;
   a Session Initiation Protocol server interface operably coupled to the memory and being configured so that the Session Initiation Protocol user agent proxy responds to provisioning messages and transmitting messages including the context information from the multi-network user platform to the Session Initiation Protocol server to maintain communications with the Session Initiation Protocol server on behalf of the multi-network user platform such that the Session Initiation Protocol server does not terminate the communication session in response to the multi-network user platform having handed off to the second network.

14. The Session Initiation Protocol user agent proxy of claim 13 further comprising:
   a multi-network user platform interface operably coupled to the memory such that the context information is stored in the memory upon receiving the context information from the multi-network user platform.

15. The Session Initiation Protocol user agent proxy of claim 14 further comprising:
   means for detecting a return of the multi-network user platform to the first network and in response thereto provisioning the multi-network user platform with context information as corresponds to the communication session using the multi-network user platform interface.

16. The Session Initiation Protocol user agent proxy of claim 14 wherein the Session Initiation Protocol server interface maintains the communications with the Session Initiation Protocol server on behalf of the multi-network user platform, at least in part, by automatically responding to at least some messages from the Session Initiation Protocol server as are directed to the multi-network user platform.

17. The Session Initiation Protocol user agent proxy of claim 14 wherein the Session Initiation Protocol server interface maintains the communications with the Session Initiation Protocol server on behalf of the multi-network user platform, at least in part, by automatically forwarding to the multi-network user platform at least some messages from the Session Initiation Protocol server as are directed to the multi-network user platform.

* * * * *